United States Patent [19]

Rowley

[11] Patent Number: 4,673,697

[45] Date of Patent: Jun. 16, 1987

[54] INSULATION MATERIAL AND ITS PREPARATION

[75] Inventor: Frederick Rowley, Astley, Nr. Shrewsbury, England

[73] Assignee: Shell Internationale Research Maatschappij B.V., Netherlands

[21] Appl. No.: 886,312

[22] Filed: Jul. 17, 1986

[30] Foreign Application Priority Data

Aug. 5, 1985 [GB] United Kingdom ............... 8519654

[51] Int. Cl.$^4$ .............................................. C08J 9/32
[52] U.S. Cl. .................................. 523/218; 106/15.05; 106/87; 252/62; 521/54; 523/219; 524/2
[58] Field of Search ................. 106/15.05, 87; 252/62; 523/218, 219; 521/54; 524/2

[56] References Cited

U.S. PATENT DOCUMENTS

| | | | |
|---|---|---|---|
| 3,989,534 | 11/1976 | Plunguian et al. | 106/86 |
| 4,157,325 | 6/1979 | Charles | 523/219 |
| 4,171,985 | 10/1979 | Motoki et al. | 106/40 R |
| 4,210,725 | 7/1980 | Redfarn | 521/83 |
| 4,303,061 | 12/1981 | Torobin | 126/450 |
| 4,303,450 | 12/1981 | Hacker | 106/88 |
| 4,341,561 | 4/1982 | Britt et al. | 106/87 |
| 4,375,489 | 3/1983 | Muszynski | 523/218 |
| 4,385,135 | 5/1983 | Lauger et al. | 523/219 |
| 4,401,471 | 8/1983 | Eckardt et al. | 106/87 |
| 4,425,440 | 1/1984 | Bloemberger et al. | 523/218 |
| 4,522,878 | 6/1985 | Martin et al. | 523/218 |

FOREIGN PATENT DOCUMENTS

54-116022  3/1978  Japan.

*Primary Examiner*—Morton Foelak
*Attorney, Agent, or Firm*—Jones, Tullar & Cooper

[57] ABSTRACT

The invention provides an insulation material in the form of a cured composition comprising as components:
(a) 10 to 30% w magnesium chloride,
(b) 0 to 15% w of an organic resin,
(c) 0 to 0.5% w of a mould-release agent,
(d) 0.1 to 1% w of a surfactant,
(e) 6 to 8% w of a sodium polyphosphate glass,
(f) 6 to 20% w magnesium oxide,
(g) 4 to 20% w inorganic filler,
(h) 15 to 30% w cenospheres,
(i) 1 to 3 % w orthophosphoric acid,
(j) 0 to 12 % w inorganic fibres, in overall proportions to total 100%, having a density in the range 200 to 500 kg/m$^3$; and its preparation.

6 Claims, No Drawings

INSULATION MATERIAL AND ITS PREPARATION

This invention relates to insulation material and its preparation. It is especially useful as fire protection material.

Various insulation materials have been proposed and are used for heat and/or fire protection purposes, e.g. concretes, ceramic fibre blankets and boards. Most existing insulation materials of this type suffer from disadvantages of high weight (high density), ultimate thermal instability and/or tendency to produce toxic by-products (e.g. hydrogen chloride) upon exposure to high temperatures (e.g. 800°–1000° C. or higher).

There is thus a continued need for new thermally stable lightweight insulation materials which can be employed in fire protection applications.

According to the present invention there is provided an insulation material in the form of a cured composition comprising as components:

(a) 10 to 30%w magnesium chloride,
(b) 0 to 15%w of an organic resin,
(c) 0 to 0.5%w of a mould-release agent,
(d) 0.1 to 1%w of a surfactant,
(e) 6 to 8%w of a sodium polyphosphate glass,
(f) 6 to 20%w magnesium oxide,
(g) 4 to 20%w inorganic filler,
(h) 15 to 30%w cenospheres,
(i) 1 to 3%w orthophosphoric acid,
(j) 0 to 12%w inorganic fibres, in overall proportions to total 100%, having a density in the range 200 to 500 kg/m$^3$.

Those skilled in the art will appreciate that the above percentages are given on the basis of ingredients incorporated in the composition and on the assumption that free water and any other volatile component which may be present in the composition before curing will be evaporated off in curing or post-curing and hence not be present in the insulation material.

Preferred insulation materials in accordance with the invention have one or more of the following features:

(1) the magnesium chloride is present in an amount from 11 to 20%w,
(2) the magnesium chloride is present in an amount from 12 to 17%w,
(3) organic resin is present in an amount from 8 to 11%w,
(4) the mould-release agent is present in an amount from 0.3 to 0.5%w,
(5) the surfactants is present in an amount from 0.4 to 0.8%w,
(6) the sodium polyphosphate glass is present in an amount from 7 to 8%w,
(7) the magnesium oxide is present in an amount from 12% to 19%w,
(8) the magnesium oxide is present in an amount from 16 to 18%w,
(9) the inorganic filler is present in an amount from 13 to 17%w,
(10) the cenospheres are present in an amount from 20 to 28%w,
(11) the cenospheres are present in an amount from 22 to 26%w,
(12) the orthophosphoric acid is present in an amount from 1.5 to 2.5%w, and
(13) the inorganic fibres are present in an amount from 8 to 11%w.

One preferred insulation material in accordance with the invention has features (1), (7), (9) and (10) above. Another, more preferred, such material has features (2) to (6), (8), (9) and (11) to (13).

An important advantage of the invention is that relatively-thin lightweight coatings of the material according to the invention provide excellent protection against fire. This is in marked contract to the phenolic foam fire protection systems where relatively-thick quantities of material are required to give the desired level of fire protection. The material according to the invention also compares very favourably with the cementitious vermiculite fire protection material which inherently has a greater density and is required to be used in greater thickness to provide adequate fire protection.

Moreover, the material according to this invention is thermally stable, i.e. it does not degrade under the influence of heat or fire whereas, phenolic foam systems break down and generate fumes harmful to equipment and to man, and the cementitious vermiculite product degrades by release of chemically-bound water in the cement.

Further in accordance with the invention there is provided a process for preparing an insulation material as described above, which process comprise forming a homogeneous aqueous mixture of components (a) to (i) together with an inert blowing agent and water, with entrainment of air, before, during or immediately after incorporation of component (i) in the mixture, until volume of the mixture has increased by 3 to 6 times, incorporating component (j) where present in the eventual material, and curing the mixture.

In a preferred process of the invention, the homogeneous aqueous mixture is formed by dissolving the component (a) in water, mixing the resulting solution with components (d), (e), (f), (g) and (h), and, where present, components (b) and (c), subjecting the resulting mixture to mixing with entrainment of air until the volume has increased by 3 to 6 times, and thereafter incorporating component (i) therein.

In the above processes, the amount of water employed will be determined by whether the mixture is to be poured onto open tooling surfaces, introduced into closed moulds, spread onto a substrate or sprayed onto a substrate, prior to curing. In general, for a pourable mixture, the amount of water in the homogeneous aqueous mixture relative to the amount of component (a) is preferably in the range 0.6 to 0.8:1 (w/w).

Tooling or mould surfaces are advantageously preheated to temperatures in the range 25° to 90° C. Curing may advantageously be effected at temperatures in the range 60° to 90° C., followed by post-cure at temperatures above 100° C., preferably 150° to 350° C., thereby ensuring good bonding throughout the insulation material and evaporation of free water and other volatile components (e.g. the inert blowing agent).

The inert blowing agent may conveniently be a liquid fluorohydrocarbon or chlorofluoroalkane, e.g. trichlorotrifluoroethane. ("ARCTON 113") (trade mark).

It will be understood that the density of the insulation material according to the invention can be varied simply by changing the quantity of blowing agent employed and the amount of air entrained in the material during the preparational stages.

The organic resin may for example be a water-based thermosetting resin such as a water-based melamine resin.

The mould release agent may be any water-compatible release agent, e.g. a condensation product of a synthetic resin with organic acid derivatives.

The surfactant may be a single surfactant or more than one surfactant, e.g. an organo-silicon surfactant and/or a non-ionic surfactant such as a condensation product of ethylene oxide and an alkyl phenol (e.g. nonylphenol) for example "TRITON X 100", "TRITON X 155", "TRITON X 156" or "EMPILAN NP9" (trade marks).

The magnesium oxide preferably has a particle size less than 76 microns, more preferably less than 65 microns, and advantageously less than 53 microns.

The inorganic filler may comprise one or more filler materials e.g. silica, such as "AEROSIL" or "CAB-O-SIL" (trademarks), talc, mica, wollastonite, zirconium silicate, titanium dioxide, vermiculite, pyrophillite, perlite, montmorillonite, bentonite and kaolin.

It is preferred for the filler material or materials which comprise the inorganic filler to have a particle size less than 105 microns, advantageously less than 88 microns, and more advantageously less than 76 microns. Preferably at least 50%w, more preferably at least 60%w, of the inorganic filler has a particle size less than 65 microns, advantageously less than 53 microns.

Cenospheres are hollow inert spherical particles which are conveniently derived from pulverised fuel ash, being the fraction of such ash which floats on water. Preferred cenospheres are those in the size range 50 to 150 microns.

The inorganic fibres are conveniently mineral fibres, for example, fibres manufactured from volcanic rock and limestone or asbestos, or they may be glass fibres, ceramic fibres or metallic fibres. Fibre lengths up to 10 mm are very effective, e.g. fibres having lengths in the range 1 to 10 mm.

Insulation materials in accordance with the invention have potentially advantageous application in a variety of environments where a combination of lightness in weight and good fire and/or heat insulation properties are required, for example in areas as diverse as offshore oil platforms and in domestic appliances such as ovens.

One specific environment where insulation materials in accordance with the invention may be particularly useful is in the protection of brittle substrates. The insulation materials tend to yield when subjected to a mechanical impact, and will thus afford sacrificial protection to any brittle substrate to which they may be applied, e.g. reinforced plastics pipes, such as glass-fibre reinforced epoxy resin pipes.

The insulation material may also be moulded into blocks, bricks or tiles of any shape and used as lightweight building materials in their own right.

The invention will be further understood from the following Examples.

EXAMPLE 1

An insulation material was prepared according to the following composition:

TABLE I

| Component Number | Component Name | Quantity (parts by weight) (pbw) | % w in cured Composition |
|---|---|---|---|
| 1 | Magnesium chloride solution | 125 | *14.3 |
| 2 | "Melamine BT350" (trademark) | 50 | 9.5 |
| 3 | "PAT-A-523" (trademark) | 2 | 0.4 |
| 4 | Silicone "DC193" | 1 | 0.2 |

TABLE I-continued

| Component Number | Component Name | Quantity (parts by weight) (pbw) | % w in cured Composition |
|---|---|---|---|
| 5 | Phosphate salts SHMP | 40 | 7.6 |
| 6 | Fused magnesium oxide | 90 | 17.2 |
| 7 | Supreme China Clay | 20 | 3.8 |
| 8 | Mica 325 (wet ground) | 30 | 5.7 |
| 9 | "Perlite TFP.1" (trademark) | 30 | 5.7 |
| 10 | "Empilan NP9" (trademark) | 2 | 0.4 |
| 11 | Trichlorotrifluoroethane | 30 | **— |
| 12 | "Fillite 300/7" (trademark) | 125 | 23.8 |
| 13 | Ortho phosphoric acid | 10 | 1.9 |
| 14 | Glass fibres (6 mm) | 50 | 9.5 |

*less water
**volatile - not present in cured composition

In Table I, component 1 is an aqueous magnesium chloride solution comprising magnesium chloride and water in a ratio 75:50 (w/w).

Component 2 is a cyclic trimer of cyanamide which assists air entrapment and acts as a flow agent and matrix performance improver.

Component 3 is a condensation product of a synthetic resin with organic acid derivatives and acts as a mould release agent.

Component 4 is an organo-silicon surfactant.

Component 5 is a sodium polyphosphate glass in the form of a powder (packing density 1.4 g/ml) which acts at higher temperatures (post-cure) to assist in bonding between magnesium oxychloride and phosphates.

Component 6 has a particle size less than 53 microns.

Component 7 is kaolin ($Al_4Si_4(OH)_8$ plus impurities) having a particle size less than 53 microns, 94%w being less than 2 microns. It acts as a lubricant during mixing and aids formation of ceramic bonding above 1000° C.

Component 8 is mica having a particle size less than 50 microns. It is a low conductivity filler, but also acts as a flux at temperatures above 900° C.

Component 9 is an expanded aluminosilicate having particle size less than 75 microns. Its function is as a lightweight inert low-conductivity filler.

Component 10 is a nonyl phenol ethoxylate, which acts as an air entraining agent and foam stabiliser.

Component 11 ("Arcton 113") (trademark) is an inert blowing agent.

Component 12 comprises cenospheres of an $Al_2O_3/SiO_2/Fe_2O_3$ glass, of diameters in the range 50–150 microns.

Component 13, orthophosphoric acid, acts in chemical binding together with components 1, 5 and 6 to form an inorganic matrix and also in curing of component 2.

Component 14 comprises glass fibres having fibre length in the range 2–10 mm (nominally 6 mm) and acts as a matrix reinforcement.

The process for preparation of the material was as follows.

Components 2, 3 and 4 were added to component 1 at ambient temperature (20° C.), with stirring. Component 5 was added to the resulting mixture, with continued stirring, and once all salts were completely dissolved, components 6 and 7 were introduced and mixed in, the resulting mixture being beige in colour and having a low-viscosity free-flowing pasty texture.

Components 10 and 11 were added, with stirring, followed by half of component 12, and stirring was continued until a thick homogeneous paste was obtained.

The paste was transferred to a high-speed mixer (for small quantities, to the bowl of a "Hobart Kitchen Aid" (trademark) electric mixer equiped with a wire whisk). The remainder of component 12 and components 8 and 9 were added and mixed in at high speed to give a mixture in the form of a fluid, easily worked semi-dough. Component 13 was then mixed in at high speed, followed by component 14. Component 14 was added at a late stage in order to minimise damage to individual glass fibres.

Duration of mixing prior to transfer to the high-speed mixer was 3 to 4 minutes. High-speed mixing took up to 10 minutes. The high-speed mixing was effected in such a way as to entrain air, and was carried out for sufficiently long for the final mixture to be about 4 to 5 times the total volume of the original components.

The final mixture was introduced into moulds preheated to 60° to 90° C. Although the moulds were closed, they did not place the mixture under pressure. Foaming and intensification of the foam occurred over 10 to 15 minutes, and after 30 minutes at 60° to 90° C. the temperature was increased to 150° to 200° C. for 60 minutes and then to 350° C. for 3 hours post-cure.

The post-cure serves to achieve bonding in the matrix and to achieve evaporation of volatile components. Weight reduction of the order of 12% was noted.

On cooling the resulting insulation material was found to have a density of 240 kg/m$^3$.

Other properties of the insulation material were determined with results as shown in Table II following.

TABLE II

| Tensile strength: | | |
|---|---|---|
| cohesive strength | 85 KN/m$^2$ | |
| adhesive strength* | 30 KN/m$^2$ | |
| Thermal conductivity: | at hot face temperature | conductivity W/M°K. |
| | 600° C. | 0.13 |
| | 790° C. | 0.15 |
| | 1000° C. | 0.19 |
| Impact hardness #: | 240 | |

*material self-bonded to shot-blasted and primed steel plate
using impact device G on an "Equitip" (trade mark) hardness tester.

EXAMPLE 2

Fire Protection Test

The insulation and fire protection material according to the invention was subjected to a large-scale furnace fire test along with two commercially-available fire protection materials, namely:
(a) Phenolic foam together with a laminate wrap; and
(b) Cementitious material based on portland cement and vermiculites. (MANDOLITE 550).

In the test a glass-fibre reinforced plastic pipe (10 mm wall thickness and 220 mm outside diameter) was filled with nitrogen gas at 0.8 bar overpressure and sealed. The insulation material according to the invention was moulded into two half shells the interior contours of which matched the outer surface of the pipe, the shells were placed round the pipe and glued together with refractory adhesive. In the case of the phenolic foam this was applied to the pipe and kept in position by a glass fibre/thermosetting resin laminate wrapped around the foam. In the case of the cementitious material this was sprayed directly onto the pipe in the form of a thick aqueous paste or slurry and allowed to dry.

Each of the three coated pipes as well as an uncoated pipe were placed in a furnace heated by a series of gas-jets, the interior of the furnace being equipped with a number of thermocouples to measure the temperature throughout the furnace. In each test the temperature/time profiles were essentially the same so that proper comparisons between the three materials could be made.

The physical properties of the three fire-protection coatings Are given in the table below as well as the time taken for each coated pipe to develop a leak in the furnace. (In this particular test it is a generally accepted fire protection standard for the pipe to withstand the temperature conditions of the furnace for a minimum of 60 minutes).

TABLE III

| PIPE COATING | COATING THICKNESS (mm) | COATING DENSITY (Kg/m$^3$) | COATING WEIGHT (Kg/m) | FIRE PROTECTION TIME (mins) (ie. to pipe leakage) |
|---|---|---|---|---|
| NONE | 0 | 0 | 0 | Less than 12 |
| Material according to the invention | 19 | 340 | 4.5 | 72 |
| Cementitious Vermiculites (MANDOLITE 550) | 28 | 550 | 10.8 | 94 |
| Phenolic foam plus | 30 | 35 | 2.3 | 67 |
| Laminate wrap | 1 | 1587 | | |

It will be seen that the material according to the invention provides very good fire protection at a thickness of only 19 mm whereas the comparative materials require about 50% greater thickness of coating material to provide adequate protection. It was also noted that the phenolic foam and the cementitious vermiculte degraded whereas the material according to the invention did not.

What is claimed is:
1. An insulation material in the form of a cured composition comprising as components:
 (a) 10 to 30%w magnesium chloride,
 (b) 0 to 15%w of an organic resin,
 (c) 0 to 0.5%w of a mould-release agent,
 (d) 0.1 to 1%w of a surfactant,
 (e) 6 to 8%w of a sodium polyphosphate glass,
 (f) 6 to 20%w magnesium oxide,
 (g) 4 to 20%w inorganic filler,
 (h) 15 to 30%w cenospheres,
 (i) 1 to 3%w orthophosphoric acid,
 (j) 0 to 12 %w inorganic fibres,
in overall proportions to total 100%, having a density in the range 200 to 500 kg/m$^3$.

2. An insulation material according to claim 1 wherein the magnesium chloride is present in an amount from 11 to 20%w, the magnesium oxide is present in an amount from 12 to 19%w, the inorganic filler is present in an amount from 12 to 18%w, and the cenospheres are present in an amount from 20 to 28%w.

3. An insulation material according to claim 1 to 2 wherein the magnesium chloride is present in an amount from 12 to 17%w, organic resin is present in an amount from 8 to 11%w, the mould-release agent is present in an amount from 0.3 to 0.5%w, the surfactant is present in an amount from 0.4 to 0.8%w, the sodium polyphosphate glass is present in an amount from 7 to 8%w, the magnesium oxide is present in an amount from 16 to 18%w, the inorganic filler is present in an amount from 13 to 17%w, the cenospheres are present in an amount from 22 to 26%w, the orthophosphoric acid is present in an amount from 1.5 to 2.5%w and the inorganic fibres are present in an amount from 8 to 11%w.

4. A process for preparing an insulation material according to any of claims 1 to 3, which comprises forming a homogeneous aqueous mixture of components (a) to (i) together with an inert blowing agent and water, with entrainment of air, before during or immediately after incorporation of component (i) in the mixture, until volume of the mixture has increased by 3 to 6 times, incorporating component (j) where present in the eventual material, and curing the mixture.

5. A process according to claim 4 wherein the homogeneous aqueous mixture is formed by dissolving the component (a), (d), (e), (f), (g) and (h), and, where present, components (b) and (c), subjecting the resulting mixture to mixing with entrainment of air until the volume has increased by 3 to 6 times, and thereafter incorporating component (i) therein.

6. A process according to claim 4 or 5 wherein the amount of water in the homogeneous aqueous mixture relative to the amount of component (a) is in the range 0.6 to 0.8:1.

* * * * *